US009964000B2

(12) United States Patent
Hikichi et al.

(10) Patent No.: US 9,964,000 B2
(45) Date of Patent: May 8, 2018

(54) COMBINED HEAT AND POWER SYSTEM INCLUDING EXPANDER HAVING EXPANSION VOLUME RATIO EQUAL TO OR LESS THAN THAT OF THEORETICAL RANKINE CYCLE

(71) Applicant: Panasonic Intellectual Property Management Co., Ltd., Osaka (JP)

(72) Inventors: Takumi Hikichi, Osaka (JP); Osao Kido, Kyoto (JP); Atsuo Okaichi, Osaka (JP); Noriyoshi Nishiyama, Osaka (JP); Yoshio Tomigashi, Osaka (JP); Masaaki Konoto, Kyoto (JP); Osamu Kosuda, Osaka (JP); Subaru Matsumoto, Osaka (JP); Tetsuya Matsuyama, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 302 days.

(21) Appl. No.: 14/675,874

(22) Filed: Apr. 1, 2015

(65) Prior Publication Data
US 2015/0285101 A1 Oct. 8, 2015

(30) Foreign Application Priority Data
Apr. 4, 2014 (JP) .................................. 2014-077533

(51) Int. Cl.
*F01K 17/02* (2006.01)
*F01K 13/00* (2006.01)
(Continued)

(52) U.S. Cl.
CPC ................ *F01K 17/02* (2013.01); *F01K 7/16* (2013.01); *F01K 13/02* (2013.01); *F01K 25/08* (2013.01); *F01C 1/0207* (2013.01); *Y02E 20/14* (2013.01)

(58) Field of Classification Search
CPC .......... F01K 13/00; F01K 13/02; F01K 17/02; F01K 17/06; F01K 23/065
See application file for complete search history.

(56) References Cited

U.S. PATENT DOCUMENTS 4,185,465 A * 1/1980 Shaw ........................ F01K 7/34
290/52
4,733,536 A * 3/1988 DiBella ................. F01K 23/065
417/309

(Continued)

FOREIGN PATENT DOCUMENTS

DE 102010024186 12/2011
EP 1316679 6/2003
(Continued)

OTHER PUBLICATIONS

"Optimization of Design Pressure Ratio of Positive Displacement Expander for Engine Waste Heat Recovery of Vehicle", Young et al. Department of Engine Research, Korea Institute of Machinery & Materials, Journal of Energy Engineering, vol. 21, No. 4, pp. 411-418, 2012.*

(Continued)

*Primary Examiner* — Laert Dounis
(74) *Attorney, Agent, or Firm* — McDermott Will & Emery LLP (57) ABSTRACT

A combined heat and power system according the present disclosure includes a Rankine cycle apparatus including an evaporator that heats a working fluid by heat exchange between the working fluid and a heat source medium, an expansion machine that converts expansion power of the (Continued)

working fluid into rotational power, and a condenser that cools the working fluid by heat exchange between the working fluid and a heat medium, and a thermal circuit for using the heat medium heated by the condenser. An expansion volume ratio of the expansion machine is equal to or less than an expansion ratio in a theoretical Rankine cycle determined based on a state of a temperature and a pressure of the working fluid at a discharge port of the expansion machine and a state of a temperature and a pressure of the working fluid at a suction port of the expansion machine.

9 Claims, 5 Drawing Sheets (51) Int. Cl.
F01K 7/16 (2006.01)
F01K 13/02 (2006.01)
F01K 25/08 (2006.01)
F01C 1/02 (2006.01)

(56) References Cited

U.S. PATENT DOCUMENTS

| | | | | |
|---|---|---|---|---|
| 5,833,446 A * | 11/1998 | Smith | ............... | F01K 21/005 418/201.1 |
| 6,053,418 A * | 4/2000 | Guyer | ............... | F01K 17/02 237/12.1 |
| 2003/0213246 A1 * | 11/2003 | Coll | ............... | F01K 17/02 60/653 |
| 2009/0071156 A1 * | 3/2009 | Nishikawa | ............... | F01K 13/02 60/660 |
| 2009/0241581 A1 * | 10/2009 | Hasegawa | ............... | F01C 1/3564 62/324.6 |
| 2010/0101224 A1 * | 4/2010 | Kasuya | ............... | F01K 15/02 60/597 |
| 2010/0205959 A1 * | 8/2010 | Kasuya | ............... | F01K 23/065 60/618 |
| 2014/0224469 A1 * | 8/2014 | Mirmobin | ............... | F24H 9/2007 165/244 |

FOREIGN PATENT DOCUMENTS

| | | |
|---|---|---|
| EP | 2014880 | 1/2009 |
| EP | 2204902 | 7/2010 |
| JP | 10-266980 | 10/1998 |

OTHER PUBLICATIONS

"Optimization of Design Pressure Ratio of Positive Displacement Expander for Engine Waste Heat Recovery of Vehicle", Young et al. Department of Environmental and Energy Systems, Korea Institute of Machinery & Materials, Energies, 7, pp. 6105-6117, 2014.*

The Extended European Search Report dated Sep. 28, 2015 for the related European Patent Application No. 15161403.9.

* cited by examiner

COMBINED HEAT AND POWER SYSTEM INCLUDING EXPANDER HAVING EXPANSION VOLUME RATIO EQUAL TO OR LESS THAN THAT OF THEORETICAL RANKINE CYCLE

BACKGROUND

1. Technical Field

The present disclosure relates to a combined heat and power system.

2. Description of the Related Art

A combined heat and power system (CHP system) is a system configured to concurrently obtain multiple types of energy (such as heat and electric power) from a single resource or a plurality of resources. Recently, a CHP system that can be provided in a relatively small facility such as a hospital, school, or library or a CHP system (so-called micro CHP) for ordinary households is attracting attention in addition to a large CHP system.

In a CHP system, a Rankine cycle can be used as an electric power generation cycle. For example, European Patent Application Publication No. 2014880 proposes the use of a displacement type expansion machine for a Rankine cycle so as to meet a relatively small heat demand and electricity demand. In a CHP system for small facilities or ordinary households, fluctuations in heat demands such as the amount of heat consumption, the required temperature, and the like have large effects on the performance and efficiency of the CHP system.

The efficiency of a CHP system is represented by the ratio of the electricity and heat used efficiently to the fuel supplied to the CHP system. Efficient use of all electricity and heat obtained by a CHP system maximizes the total efficiency of a CHP system, thereby producing an advantage of installation of the CHP system. A CHP system that uses a Rankine cycle generates more heat than a CHP system that uses a gas engine. Effective use of heat improves the total efficiency of a CHP system.

In small facilities or ordinary households, the required amount of heat and the required temperature differ for each facility or household. In addition, even in a single facility or household, when, for example, heat is used for heating, fluctuations in the heating load and/or the required heating temperature are large between night and day. Fluctuations in the heating load and/or the required heating temperature are also large between winter and summer. Since a hot-water supply load is generated temporarily when heat is used for hot-water supply, fluctuations in the required amount of heat and the required temperature become large. Accordingly, small facilities or ordinary households require CHP systems that can meet the heat demand and the heat temperature that fluctuate significantly.

SUMMARY

However, the related art described above has room for improvement of the efficiency of a CHP system. One non-limiting and exemplary embodiment provides a technique for improving the efficiency of a CHP system.

In one general aspect, the techniques disclosed here feature a combined heat and power system comprising: a Rankine cycle apparatus including an evaporator that heats a working fluid by heat exchange between the working fluid and a heat source medium, an expansion machine that converts expansion power of the working fluid into rotational power, and a condenser that cools the working fluid by heat exchange between the working fluid and a heat medium; and a thermal circuit that uses the heat medium heated by the condenser, wherein, an expansion volume ratio of the expansion machine is equal to or less than an expansion ratio in a theoretical Rankine cycle determined based on a discharge state and a suction state, in the discharge state a temperature and a pressure of the working fluid at a discharge port of the expansion machine being determined by a temperature Tl of the heat medium at an outlet of the condenser and by a saturated vapor pressure Pd of the working fluid at the temperature Tl, and in the suction state a temperature and a pressure of the working fluid at a suction port of the expansion machine being determined based on a temperature Th of the heat source medium at an inlet of the evaporator.

The present disclosure can improve the efficiency of a CHP system.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION (Underlying Knowledge Forming Basis of the Present Disclosure)

The inventors found the occurrence of the following problems about the CHP system described in BACKGROUND.

The CHP system disclosed in European Patent Application Publication No. 2014880 is configured to cool working fluid and to heat water in a condenser (radiator) of a Rankine cycle. That is, hot water for heating or hot-water supply is generated by the condenser. Accordingly, if the amount of heat of hot water and the temperature of hot water fluctuate, the condensation temperature of a Rankine cycle fluctuates. That is, the low-pressure-side pressure of a Rankine cycle fluctuates.

Generally, an expansion machine used for a Rankine cycle has a fixed volumetric capacity ratio. If the suction condition (the temperature and pressure of a working fluid at the suction port) of an expansion machine is determined, the discharge condition (the temperature and pressure of the working fluid at the discharge port) of the expansion machine is determined. If the low-pressure-side pressure of a Rankine cycle is higher than the lowest pressure, which depends on the designed volumetric capacity ratio of the expansion machine, overexpansion of the working fluid occurs in the expansion machine. If the low-pressure-side pressure is lower than the lowest pressure, underexpansion of the working fluid occurs in the expansion machine.

If overexpansion of the working fluid occurs in the expansion machine, a loss due to overexpansion is caused, thereby reducing the amount of generated electricity by the expansion machine. In addition, if the magnitude relationship between the pressure of the operation room of the expansion machine and the low-pressure-side pressure of a Rankine cycle is reversed in the middle of an expansion process, the direction in which a force is applied in the operation room is reversed. As a result, structural members of the expansion machine are likely to be broken and bearings are likely to wear, thereby reducing the reliability of the expansion machine.

Japanese Unexamined Patent Application Publication No. 10-266980 discloses a scroll expansion machine that includes a control path communicating between an operation room and the internal space of a sealed case and a valve mechanism disposed in the control path to prevent overexpansion. The valve mechanism is configured to open when the pressure of the operation room reaches a predetermined pressure. However, the addition of the control path and the valve mechanism complicates the structure of the expansion machine and increases the production cost of the expansion machine. The valve mechanism may be broken due to aged deterioration, reducing the reliability and durability of the expansion machine.

To solve such problems, a first aspect of the present disclosure provides a combined heat and power system comprising: a Rankine cycle apparatus including an evaporator that heats a working fluid by heat exchange between the working fluid and a heat source medium, an expansion machine that converts expansion power of the working fluid into rotational power, and a condenser that cools the working fluid by heat exchange between the working fluid and a heat medium; and a thermal circuit that uses the heat medium heated by the condenser, wherein, an expansion volume ratio of the expansion machine is equal to or less than an expansion ratio in a theoretical Rankine cycle determined based on a discharge state and a suction state, in the discharge state a temperature and a pressure of the working fluid at a discharge port of the expansion machine being determined by a temperature Tl of the heat medium at an outlet of the condenser and by a saturated vapor pressure Pd of the working fluid at the temperature Tl, and in the suction state a temperature and a pressure of the working fluid at a suction port of the expansion machine being determined based on a temperature Th of the heat source medium at an inlet of the evaporator.

In the first aspect, the expansion ratio (expansion volume ratio) of the expansion machine is determined in consideration of the temperature of a heat source medium and the temperature of a heat medium. Therefore, in the structure of the first aspect, even if the temperature of the heat source medium and the temperature of the heat medium fluctuate, overexpansion of the working fluid in the expansion machine can be prevented and occurrence of an overexpansion loss and reduction in the reliability of the expansion machine can be prevented. The temperature and pressure of the working fluid at the discharge port of the expansion machine and the temperature and pressure of the working fluid at the suction port of the expansion machine may be determined indirectly based on other measurement values or may be measured directly.

A second aspect of the present disclosure provides the combined heat and power system according to the first aspect in which the temperature Tl of the heat medium is a temperature of the heat medium at the outlet of the condenser when the condenser heats the heat medium to an upper limit in a predetermined fluctuation range. In other words, when the temperature of the heat medium at the outlet of the condenser fluctuates, the expansion ratio (expansion density ratio) in a theoretical Rankine cycle can be obtained by defining the highest temperature in the temperature fluctuation range as temperature Tl. This can surely prevent the overexpansion of the working fluid even if the temperature of the heat medium at the outlet of the condenser fluctuates.

A third aspect of the present disclosure provides the combined heat and power system according to the first or second aspect in which the heat medium is water. If water, which is easy to handle, is used as the heat medium, the scope of heat utilization is widened and the heat utilization efficiency is improved. As a result, a combined heat and power system with excellent total efficiency can be provided.

A fourth aspect of the present disclosure provides the combined heat and power system according to the first or second aspect in which the heat medium is air. If air, which is easy to handle, is used as the heat medium, the scope of heat utilization is widened and the heat utilization efficiency is improved. As a result, a combined heat and power system with excellent total efficiency can be provided.

A fifth aspect of the present disclosure provides the combined heat and power system according to any one of the first to fourth aspects in which the expansion machine is a displacement type expansion machine. In a displacement type expansion machine, high efficiency operation is enabled in a wide range of revolutions. That is, even if the amount of circulation of the working fluid of a Rankine cycle increases or reduces, use of a displacement type expansion machine can keep high efficiency electric power generation. Therefore, a displacement type expansion machine is best suit to the case in which fluctuations in heat demands are large and fluctuations in the amount of heat supplied from the heat medium are large. In addition, a displacement type expansion machine is appropriate for a small output system as compared with a turbo type expansion machine. For example, in the output range from approximately 300 W to 5 kW, a displacement type expansion machine has high efficiency and its cabinet can be small-sized. Therefore, a system including a displacement type expansion machine is appropriate for a place with a small heat demand and electricity demand, such as a home, school, and shop.

A sixth aspect of the present disclosure provides the combined heat and power system according to any one of the first to fifth aspects in which the thermal circuit includes at least one of a heating circuit and a hot-water supply circuit. Efficient use of heat of the heat medium improves the heat utilization efficiency, thereby providing a combined heat and power system with excellent total efficiency.

A seventh aspect of the present disclosure provides the combined heat and power system according to any one of the first to sixth aspects in which the temperature Tl of the heat medium is a highest temperature of the heat medium at the outlet of the condenser in winter. When a heat medium is used for heating and/or hot-water supply, a heat medium with the highest temperature in winter is necessary. As is known by those skilled in the art, the low-pressure-side pressure of a Rankine cycle depends on the temperature of a heat medium used to cool the working fluid. That is, when the temperature of the heat medium is high, the low-pressure-side pressure of a Rankine cycle is high. Accordingly, if the expansion volume ratio of an expansion machine is set with respect to winter, overexpansion of the working fluid does not occur in the expansion machine even if the temperature of the heat medium becomes low in another season. Throughout the year, overexpansion can be prevented in the entire range of fluctuations in the temperature of the heat medium.

An eighth aspect of the present disclosure provides the combined heat and power system according to any one of the first to seventh aspects in which the working fluid is an organic working fluid. Normally, the boiling point of an organic working fluid is low. Accordingly, use of an organic working fluid enables electric power generation at high efficiency even when the temperature of a heat source is less than approximately 300° C.

A ninth aspect of the present disclosure provides the combined heat and power system according to any one of the first to eighth aspects in which the working fluid is in a gaseous phase state at the discharge port of the expansion machine during operation of the combined heat and power system.

Embodiments of the present disclosure will be described below with reference to the drawings. The present disclosure is not limited by the following embodiment.

Figure 1:
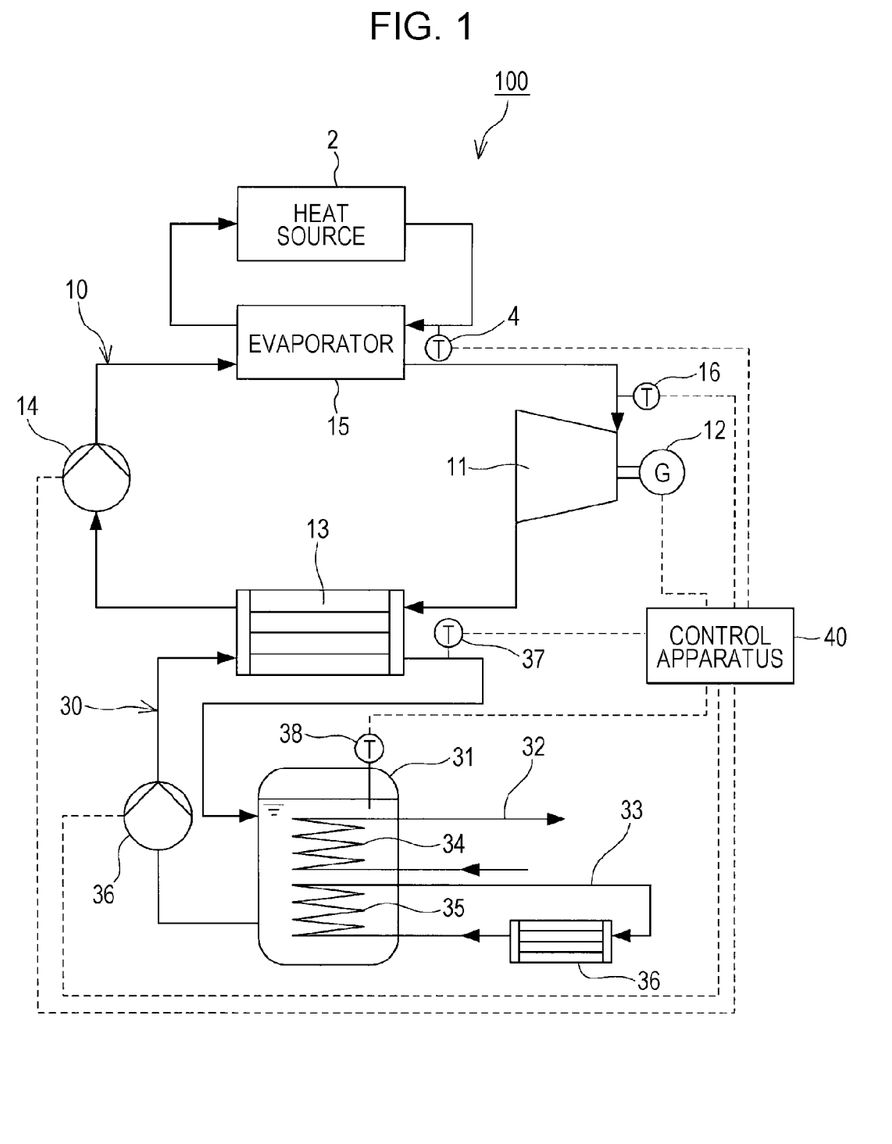
FIG. 1 shows the structure of a CHP system according to an embodiment of the present disclosure.

As shown in FIG. 1, a combined heat and power system 100 (referred to below as the CHP system) according to the present embodiment includes a heat source 2, a Rankine cycle apparatus 10, a thermal circuit 30, and a the control apparatus 40. The CHP system 100 is configured so as to be able to concurrently obtain hot water and electric power using heat energy of the heat source 2. "Concurrently" means that it is possible to supply electric power while supplying hot water.

The heat source 2 is used to heat the working fluid of the Rankine cycle apparatus 10. The type of the heat source 2 is not particularly limited. For example, heat such as exhaust heat or geothermal heat is recovered by a fluid such as water or oil to obtain high-temperature steam or high-temperature oil. The obtained high-temperature steam or high-temperature oil may be used as a heat source medium. A boiler may also be used as the heat source 2. In this case, a combustion gas is used as a heat source medium.

The Rankine cycle apparatus 10 includes an expansion machine 11, a condenser 13, a pump 14, and an evaporator 15. These components are connected annularly in the above order through a plurality of pipes so as to form a closed circuit. In the present embodiment, a reheater for obtaining very hot water is not disposed between the discharge port of the expansion machine 11 and the inlet of the condenser 13. The working fluid discharged from the expansion machine 11 enters the condenser 13 while maintaining the discharge temperature.

The expansion machine 11 converts the expansion energy of the working fluid into rotational power by expanding the working fluid. The electric generator 12 is connected to the rotational shaft of the expansion machine 11. The electric generator 12 is driven by the expansion machine 11. The expansion machine 11 is, for example, a displacement type or turbo type expansion machine. Examples of a displacement type expansion machine are a scroll expansion machine, rotary expansion machine, screw expansion machine, reciprocating expansion machine, and the like. A turbo type expansion machine is a so-called expansion turbine.

Generally, a displacement type expansion machine achieves higher expansion machine efficiency in a wider range of revolutions than a turbo type expansion machine. For example, a displacement type expansion machine can be operated at the revolutions equal to or less than one-half the rated revolutions while maintaining high efficiency. That is, the amount of generated electricity can be reduced to one-half the rated amount of generated electricity or less while maintaining high efficiency. Since a displacement type expansion machine has such characteristics, a displacement type expansion machine can respond flexibly to fluctuations in the amount of generated electricity caused by fluctuations in heat demands. In addition, a displacement type expansion machine can increase or reduce the amount of generated electricity depending on fluctuations in electric power demands while maintaining high efficiency.

The condenser 13 performs heat exchange between the water in the thermal circuit 30 and the working fluid discharged from the expansion machine 11 to cool the working fluid and heat the water. A known heat exchanger such as a plate heat exchanger or double-pipe heat exchanger can be used as the condenser 13. The type of the condenser 13 is selected appropriately depending on the type of the heat medium in the thermal circuit 30. When the heat medium in the thermal circuit 30 is a fluid such as water, a plate heat exchanger or double-pipe heat exchanger can be preferably used as the condenser 13. When the heat medium in the thermal circuit 30 is a gas such as air, a fin-tube heat exchanger can be preferably used as the condenser 13.

The pump 14 sucks and pressurizes the working fluid flowing from the condenser 13 and supplies the pressurized working fluid to the evaporator 15. A general displacement type or turbo type pump can be used as the pump 14. Examples of a displacement type pump are a piston pump, a gear pump, a vane pump, a rotary pump, and the like. Examples of a turbo type pump are a centrifugal pump, a mixed flow pump, an axial flow pump, and the like.

The evaporator 15 is a heat exchanger that sucks heat energy generated by the heat source 2. A known heat exchanger such as a plate heat exchanger, double-pipe heat exchanger, or fin-tube heat exchanger can be used as the evaporator 15. Heat exchange between a heat source medium (for example, high-temperature steam) supplied from the heat source 2 and the working fluid of the Rankine cycle apparatus 10 is performed in the evaporator 15. This heats and evaporates the working fluid of the Rankine cycle apparatus 10.

An organic working fluid can be preferably used as the working fluid of the Rankine cycle apparatus 10. Normally, the boiling point of an organic working fluid is low. Accordingly, use of an organic working fluid enables electric power generation at high efficiency even when the temperature of a high temperature fluid supplied from the heat source 2 is less than approximately 300° C.

Organic compounds such as halogenated hydrocarbon and carbon hydride can be used as an organic working fluid. Examples of halogenated hydrocarbon are R-134a, R-245fa, R-1234ze, R-356mfc, and the like. Examples of carbon hydride are alkanes such as propane, butane, pentane, and isopentane. These organic working fluids may be used independently or may be used by mixing two or more of them. Other than the above, inorganic working fluids such as water, carbon dioxide, and ammonia may be used as the working fluid.

The thermal circuit 30 is a circuit through which water (heat medium) as a low-temperature heat source, which cools the working fluid of the Rankine cycle apparatus 10, flows in the condenser 13. The water in thermal circuit 30 is heated by the working fluid discharged from the expansion machine 11. A pump 36 and a tank 31 are disposed in the thermal circuit 30. The tank 31 stores the water heated by heat exchange with the working fluid in the condenser 13. The tank 31 also has a hot-water supply heat exchanger 34 and a heating heat exchanger 35. The hot-water supply heat exchanger 34 is connected to a hot-water supply circuit 32 and the heating heat exchanger 35 is connected to a heating circuit 33 having an interior radiator 36. The hot water generated by the hot-water supply heat exchanger 34 is supplied to other facilities such as a shower and faucet through the hot-water supply circuit 32. The hot water generated by the heating heat exchanger 35 is supplied to the interior radiator 36 through the heating circuit 32. The hot water cooled by the interior radiator 36 is returned to the heating heat exchanger 35 through the heating circuit 32.

In the present embodiment, the heat medium flowing through the thermal circuit 30 is water. However, the heat medium heated by the thermal circuit 30 is not limited to water. The thermal circuit 30 may also be configured to heat another heat medium such as brine or air. The tank 31 may be omitted and the hot-water supply circuit 32 may be directly connected to the condenser 13 as a thermal circuit. In this case, the hot water generated by the hot-water supply circuit 32 may be supplied to other facilities such as a shower, faucet, or hot-water storage tank. Alternatively, the tank 31 may be omitted and the heating circuit 33 may be directly connected to the condenser 13 as a thermal circuit. In this case, the hot water generated by the heating circuit 33 may be supplied to other facilities such as the interior radiator 36. As described above, the thermal circuit 30 may be used to reheat hot water that has been cooled down or may be used to heat city water.

When the heat medium heated by the thermal circuit 30 is a fluid such as water as in the present embodiment, the thermal circuit 30 may be formed by a plurality of pipes. On the other hand, when the heat medium heated by the thermal circuit 30 is a gas such as air, the thermal circuit 30 may be formed by an air trunk or duct through which the gas flows. The hot air created by the condenser 13 may be directly supplied to the room for heating the room.

The thermal circuit 30 further includes temperature sensors 37 and 38. The temperature sensor 37 detects the temperature of the hot water (heat medium) at the outlet of the condenser 13. That is, the temperature sensor 37 detects the temperature of hot water heated by the working fluid in the condenser 13. The temperature sensor 38 detects the temperature of hot water in the tank 31.

A temperature sensor 4 is disposed in a flow channel (heat source flow channel) for supplying the heat of the heat source 2 to the evaporator 15. The temperature sensor 4 detects the temperature of the heat source medium at the inlet of the evaporator 15. That is, the temperature sensor 4 detects the temperature of the heat source medium immediately before the heat source medium is cooled by the working fluid in the evaporator 15.

The Rankine cycle apparatus 10 has a temperature sensor 16 for detecting the temperature of the working fluid at the suction port of the expansion machine 11. That is, the temperature sensor 16 detects the temperature of the working fluid after being heated in the evaporator 15 and before being expanded in the expansion machine 11. The Rankine cycle apparatus 10 may have at least one other sensor for detecting the state (temperature or pressure) of the working fluid. For example, a temperature sensor for detecting the temperature of the working fluid after being expanded in the expansion machine 11 and before being cooled in the condenser 13 may be disposed at the discharge port of the expansion machine 11.

The control apparatus 40 controls control targets such as the heat source 2, the pump 14, the electric generator 12, and the pump 36. The control apparatus 40 receives detection signals from the temperature sensor 4, the temperature sensor 16, the temperature sensor 37, and the temperature sensor 38. A digital signal processor (DSP) including an A/D conversion circuit, an input-output circuit, a computing circuit, a storage device, and the like can be used as the control apparatus 40. The control apparatus 40 stores a program for appropriately operating the CHP system 100. In the present embodiment, the control apparatus 40 is used to control the entire CHP system 100. However, a control apparatus for controlling the Rankine cycle apparatus 10 may be present separately from a control apparatus for controlling the other control targets.

The CHP system 100 is operated in the following order, for example.

First, the pump 36 of the thermal circuit 30 is driven to circulate water through the thermal circuit 30. The pump 14 is driven at an appropriate timing to start the operation of the Rankine cycle apparatus 10. When the amount of circulation of the working fluid reaches a predetermined amount of circulation, a high temperature fluid (heat source medium) is supplied from the heat source 2 to the evaporator 15. Upon receiving heat from the high temperature fluid in the evaporator 15, the working fluid of the Rankine cycle apparatus 10 changes to a gaseous working fluid in an overheat state. The high-temperature and gaseous working fluid is sent to the expansion machine 11. In the expansion machine 11, the pressure energy of the working fluid is converted into mechanical energy and the electric generator 12 is driven. This causes the electric generator 12 to generate electric power. The working fluid discharged from the expansion machine 11 flows into the condenser 13. In the condenser 13, the working fluid is cooled by water circulating through the thermal circuit 30 and then condensed. The water in the thermal circuit 30 is heated by the working fluid. Hot water is generated in the thermal circuit 30 and the generated hot water is supplied to the tank 31 and then stored therein. The condensed working fluid is pressurized by the pump 14 and then sent to the evaporator 15 again.

The hot water stored in the tank 31 of the thermal circuit 30 exchanges heat with city water flowing through the hot-water supply circuit 32 through the hot-water supply heat exchanger 34. The heated city water is used for hot-water supply using a shower or the like. The hot water stored in the tank 31 also exchanges heat with brine flowing through the heating circuit 33 through the heating heat exchanger 35. The heated brine is supplied to the radiator 36 so as to be used for room heating.

Figure 2:
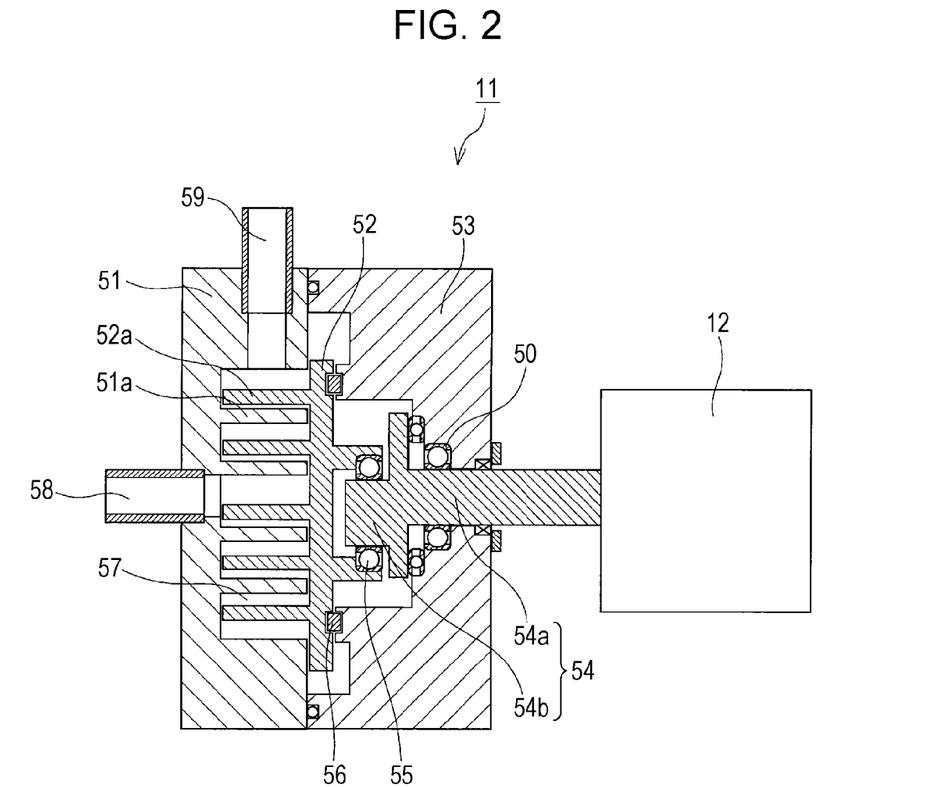
FIG. 2 is a cross-sectional view schematically showing an expansion machine.

Next, the expansion machine 11 will be described in detail.

As shown in FIG. 2, the expansion machine 11 according to the present embodiment is a scroll expansion machine including a fixed scroll 51, a turning scroll 52, a bearing block 53, and a main bearing 50. The main bearing 50 is secured to the bearing block 53 by a fastening method such as engagement and rotatably supports a main shaft 54a of a shaft 54. The fixed scroll 51 is secured to the bearing block 53 by a fastener such as a bolt (not shown). The turning scroll 52 is sandwiched between the bearing block 53 and the fixed scroll 51 so as to be engaged with an eccentric shaft part 54b of the shaft 54 via an eccentric bearing 55. A rotation restriction mechanism 56 such as an Oldham's ring is disposed between the turning scroll 52 and the bearing block 53. The rotation restriction mechanism 56 prevents the turning scroll 52 from rotating and causes the turning scroll 52 to move in a circular orbit. The fixed scroll 51 and the turning scroll 52 have spiral laps 51a and 52a, respectively. The laps 51a and 52a are engaged with each other. This forms an operation room 57 (expansion room) between the turning scroll 52 and the fixed scroll 51.

The working fluid is sucked from a suction tube 58 disposed at the center of fixed scroll 51 to the operation room 57. The rotation of the eccentric shaft part 54b of the shaft 54 causes the turning scroll 52 to move eccentrically. This moves the operation room 57 from the center to the perimeter side while increasing its volumetric capacity. The working fluid sucked to the operation room 57 expands as the operation room 57 changes its volumetric capacity. After being expanded, the working fluid is discharged externally from the operation room 57 via a discharge tube 59 disposed on the perimeter of the fixed scroll 51 so as to be opened toward the operation room 57.

When the expansion machine 11 is a displacement type expansion machine, the expansion volumetric capacity ratio of the expansion machine 11 is the ratio of the volumetric capacity of the operation room 57 at the end time of a suction process to the volumetric capacity of the operation room 57 at the start time of a discharge process. The discharge process is a process for discharging the expanded working fluid from operation room 57. The suction process is a process for sucking the working fluid to be expanded into the operation room 57. If the volumetric capacity of the operation room 57 at the start time of the discharge process is Vo, the volumetric capacity of the operation room 57 at the end time of the discharge process is Vs, and the expansion volumetric capacity ratio of the expansion machine 11 is Re, then the expansion volumetric capacity ratio Re is represented as shown in expression (1) below.

$$Re = Vo/Vs \quad (1)$$

The expansion volumetric capacity ratio Re of the expansion machine 11 is adjusted so that, for example, the working fluid undergoes optimum expansion when the CHP system 100 is operated in the winter condition and the working fluid undergoes underexpansion when the CHP system 100 is operated in a condition (for example, the intermediate time condition) other than the winter condition. In other words, the expansion volumetric capacity ratio Re of the expansion machine 11 is adjusted so that the working fluid does not undergo overexpansion in the normal operation condition of the CHP system 100. In such a structure, the efficiency of the CHP system 100 can be improved. More specifically, the CHP system 100 can achieve the highest power generation efficiency on annual average.

In the above description, "the normal operation condition of the CHP system 100" means the condition under which the CHP system 100 can stably supply electric power and heat (hot water). Operation in a transition period such as the duration for which startup operation is performed or the duration for which shutdown operation is performed is excluded from "the normal operation condition".

"Underexpansion" in this specification means that the expansion volumetric capacity ratio Re of the expansion machine 11 is less than the expansion ratio calculated from the difference between the high pressure and the low pressure of a theoretical Rankine cycle and the temperature of the working fluid at the inlet of the expansion machine 11. The "optimum expansion" means that the expansion ratio calculated from the difference between the high pressure and the low pressure of a theoretical Rankine cycle and the temperature of the working fluid at the inlet of the expansion machine 11 substantially equals the expansion volumetric capacity ratio Re of the expansion machine 11. The "overexpansion" means that the expansion volumetric capacity ratio Re of the expansion machine 11 is larger than the expansion ratio calculated from the difference between the high pressure and the low pressure of a theoretical Rankine cycle and the temperature of the working fluid at the inlet of the expansion machine 11. The "expansion volumetric capacity ratio" represents the expansion ratio of a displacement type expansion machine and the "expansion volume ratio" represents the expansion ratio of an expansion machine of an unlimited form.

In the present embodiment, the expansion volumetric capacity ratio Re of the expansion machine 11 is set to a value equal to or less than a specific expansion ratio Ret. The "specific expansion ratio Ret" is the expansion ratio in a theoretical Rankine cycle determined based on the temperature of the heat medium at the outlet of the condenser 13 and the temperature of the heat source medium at the inlet of the evaporator 15. The method for calculating a specific expansion ratio Ret will be described in detail below.

First, the temperature of the heat medium at the outlet of the condenser 13 when the heat medium is heated to the upper limit in a predetermined fluctuation range in the condenser 13 is defined as the temperature Tl (upper limit temperature). Then, the state of the temperature and pressure of the working fluid at the discharge port of the expansion machine 11 determined based on the saturated vapor pressure Pd of the working fluid at the temperature Tl is determined as the discharge state. The temperature Tl in the present embodiment is the highest temperature of the heat medium measured at the outlet of the condenser 13 in winter and the temperature Tl is detected by the temperature sensor 37.

In the present embodiment, the thermal circuit 30 includes at least one of the hot-water supply circuit 32 and the heating circuit 33. The heat medium is water or brine. Since large heat output is not required in intermediate time, for example, hot water with a temperature of 30° C. is supplied from the tank 31 to the condenser 13 to heat the hot water to 50° C. by the condenser 13. Since large heat output is required in winter, for example, hot water with a temperature of 60° C. is supplied from the tank 31 to the condenser 13 to heat the hot water to 80° C. by the condenser 13. In this case, fluctuations in the temperature of the hot water at the outlet of the condenser 13 range from 50° C. to 80° C. and the temperature Tl of the upper limit is 80° C. However, the temperature Tl of the upper limit may be in the range from 80° C. to 90° C. The upper limit of the temperature of hot water at the outlet of the condenser 13 is predetermined for the safety of the CHP system 100. The temperature of hot water at the outlet of the condenser 13 is monitored by the control apparatus 40. The control apparatus 40 controls the CHP system 100 so that the temperature of hot water at the outlet of the condenser 13 comes close to a target temperature and does not exceed the upper limit.

Figure 3:
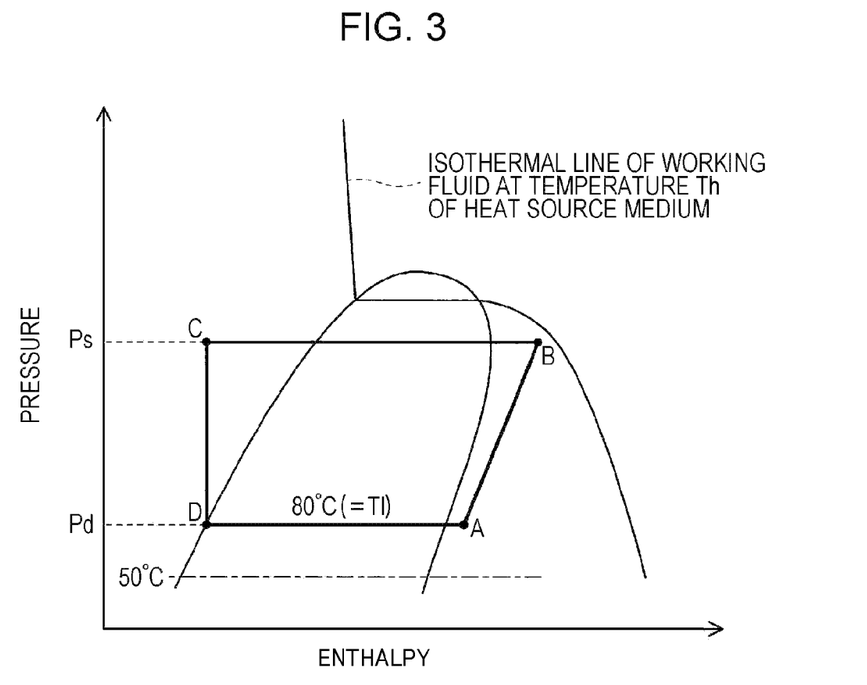
FIG. 3 is a p-h diagram showing a theoretical Rankine cycle when the CHP system in FIG. 1 is operated in a winter condition.

In the p-h diagram shown in FIG. 3, the discharge state described above is the state of point A. In the present embodiment, the working fluid in the gaseous phase is supplied to the expansion machine 11 and the working fluid in the gaseous phase is discharged from the expansion machine 11. That is, the working fluid is kept in the gaseous phase from the start to end of the expansion process. Accordingly, the working fluid is in the gaseous phase and in the overheat state at point A. The temperature of the working fluid at point A depends on the temperature Tl of hot water at the outlet of the condenser 13 and, for example, the temperature is approximately 5° C. higher than the temperature Tl (=80° C.) of hot water at the outlet of the condenser 13. The pressure Pd of the working fluid at point A is substantially equal to the saturated vapor pressure of the working fluid at the temperature Tl of hot water at the outlet of the condenser 13. That is, the low-pressure-side pressure of a Rankine cycle is determined by the temperature of hot water flowing through the thermal circuit 30.

The pressure Pd may be obtained by directly measuring the working fluid temperature of the condenser and converting the saturated vapor pressure. Alternatively, the pressure Pd can be obtained more accurately by directly measuring the pressure at the outlet of the expansion machine.

In the CHP system 100 shown in FIG. 1, a reheater may be provided between the discharge port of the expansion machine 11 and the inlet of the condenser 13. If a reheater is provided, the working fluid of a low pressure discharged from the expansion machine 11 exchanges heat with the working fluid of a high pressure discharged from the pump 14 in the reheater and the working fluid of a low pressure is cooled. Accordingly, there is a temperature difference between the working fluid discharged from the expansion machine 11 and the working fluid flowing from the reheater. This temperature difference depends on the capability of the reheater. Accordingly, even if a reheater is provided, the temperature of the working fluid at the discharge port of the expansion machine 11 can be estimated from the temperature of the heat medium at the outlet of the condenser 13 in consideration of the capability of the reheater. It is also possible to detect the temperature of the working fluid at the discharge port of the expansion machine 11 using a temperature sensor and determine point A from the detected temperature and the saturated vapor pressure of the working fluid in the condenser 13.

Next, the state of the temperature and pressure of the working fluid at the suction port of the expansion machine 11, which is determined based on the temperature Th of the heat source medium at the inlet of the evaporator 15, is defined as the suction state. The suction state is the state of point B in FIG. 3. That is, points A to D in FIG. 3 indicate the theoretical Rankine cycle determined by the suction state and the discharge state. The temperature Th of the heat source medium at the inlet of the evaporator 15 depends on what heat source is used as the heat source 2 of the CHP system 100. The temperature Th of the heat source medium at the inlet of the evaporator 15 does not depend on the operation condition of the Rankine cycle apparatus 10 and is unlikely to be affected by seasonal conditions and the like. If the temperature Th of the heat source medium at the inlet of the evaporator 15 is determined, the temperature Tk of the working fluid at the suction port of the expansion machine 11 is determined substantially in a unique manner. That is, the temperature Tk of the working fluid at the suction port of the expansion machine 11 can be a little lower (for example, lower by approximately 5° C.) than the temperature Th of the heat source medium at the inlet of the evaporator 15. Since the difference between the temperature Th and the temperature Tk is relatively small, the temperature Th of the heat source medium at the inlet of the evaporator 15 may be used as the temperature Tk of the working fluid at the suction port of the expansion machine 11.

When an organic working fluid is used as the working fluid, the upper limit temperature of the organic working fluid is set to a temperature sufficiently smaller than the breakdown temperature of the organic working fluid to prevent the organic working fluid from being broken down. For example, the upper limit temperature of the organic working fluid is set to a temperature approximately 50° C. lower than the breakdown temperature of the organic working fluid. On the other hand, it is important to supply a working fluid with the highest possible temperature and pressure to the expansion machine 11 to improve the power generation efficiency. By taking these matters into consideration, the temperature Tk of the working fluid at the suction port of the expansion machine 11 can be determined based on the temperature of the heat source medium at the inlet of the evaporator 15 and the type (breakdown temperature) of the working fluid.

The breakdown temperature of an organic working fluid ranges from, for example, 150° C. to 350° C. For example, if the working fluid is HFC-365mfc, then the breakdown temperature (heat-resistant temperature) of the working fluid is 250° C., the temperature of the working fluid at the inlet of the expansion machine 11 is 180° C., the temperature of the working fluid at the outlet of the expansion machine 11 is 140° C., the temperature of the working fluid at the outlet of the reheater (not shown) is 90° C., the temperature of the working fluid at the inlet of the condenser 13 is 85° C., and the temperature of the heat medium (hot water) at the outlet of the condenser 13 is 80° C.

The heat source 2 may be a boiler and the heat source medium to be supplied to the evaporator 15 may be combustion gas. In this case, it is not easy to estimate the temperature Tk of the working fluid at the suction port of the expansion machine 11 based on the temperature of combustion gas. Accordingly, the temperature Tk of the working fluid at the suction port of the expansion machine 11 may be detected by a temperature sensor. Alternatively, the breakdown temperature of the organic working fluid used by the Rankine cycle apparatus 10 may be used as the temperature Tk at point B. It is possible to use, as the temperature Tk at point B, the temperature estimated from the temperature Th of the heat source medium at the inlet of the evaporator 15 or the temperature that can prevent the organic working fluid from being broken down, whichever is lower. The "temperature that can prevent the organic working fluid from being broken down" can be the temperature obtained by subtracting a predetermined temperature from the breakdown temperature. The "predetermined temperature" is, 20° C. to 100° C., for example.

In the p-h diagram in FIG. 3, the expansion process of a theoretical Rankine cycle is represented by the change from point B to point A. The change from point B to point A is made theoretically along an isentropic line. Accordingly, if the temperature (Tl+overheat degree α) at point A, the pressure Pd at point A, and the temperature Tk at point B are determined, then the pressure Ps at point B is determined. In this way, the discharge state (the state at point A) and the suction state (the state at point B) can be obtained. The pressure Ps at point B may be the highest pressure that can be taken by the working fluid in the Rankine cycle apparatus 10.

The high-pressure-side pressure Ps (saturated vapor pressure) may also be determined based on the temperature Th of the heat source medium at the inlet of the evaporator 15. Specifically, the working fluid flowing through the evaporator 15 reaches a gas-liquid two-phase state inside the evaporator 15. Therefore, the high-pressure-side pressure Ps matches the saturated vapor pressure corresponding to the temperature determined based on the temperature Th of the heat source medium at the inlet of the evaporator 15. The temperature of the working fluid in the evaporator 15, which is determined based on the temperature Th of the heat source medium, depends on the heat exchange efficiency of the evaporator 15, the structure of the flow channel of the working fluid in the evaporator 15, and the structure of the flow channel of the heat source medium in the evaporator 15. For example, the temperature of the working fluid in the evaporator 15 is lower than the temperature Th of the heat source medium at the inlet of the evaporator 15 by a predetermined temperature (for example, 5° C. to 10° C.). That is, the high-pressure-side pressure Ps of a Rankine cycle is determined by the temperature Th of the heat source medium at the inlet of the evaporator 15.

If the specific volumetric capacity of the working fluid in the suction state (point B) is Vss and the specific volumetric capacity of the working fluid in the discharge state (point A) is Vos, then the expansion ratio Ret in a theoretical Rankine cycle is represented as (Vos/Vss). This theoretical expansion ratio Ret means an expansion ratio at which the working fluid does not undergo overexpansion in the expansion machine 11. That is, when the actual expansion volumetric capacity ratio Re (=Vo/Vs) of the expansion machine 11 is equal to or less than its theoretical expansion ratio Ret, the CHP system 100 can be operated without causing overexpansion in the expansion machine 11. The actual expansion volumetric capacity ratio Re of the expansion machine 11 is preferably 2 or more. This achieves high power generation efficiency throughout the year.

Figure 4A:
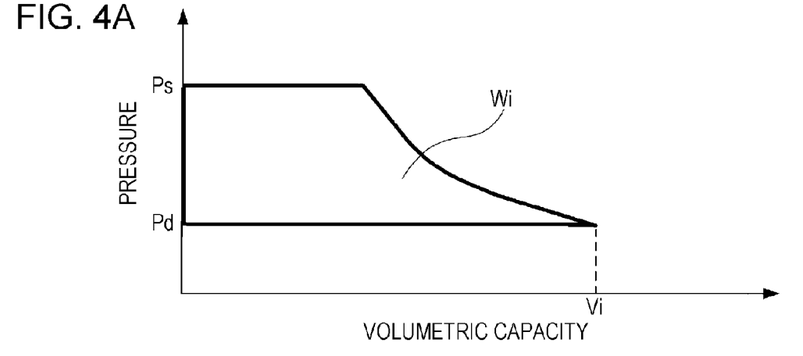
FIG. 4A is a P-V diagram showing the relationship between the pressure and the volumetric capacity of an operation room during optimum expansion.
Figure 4B:
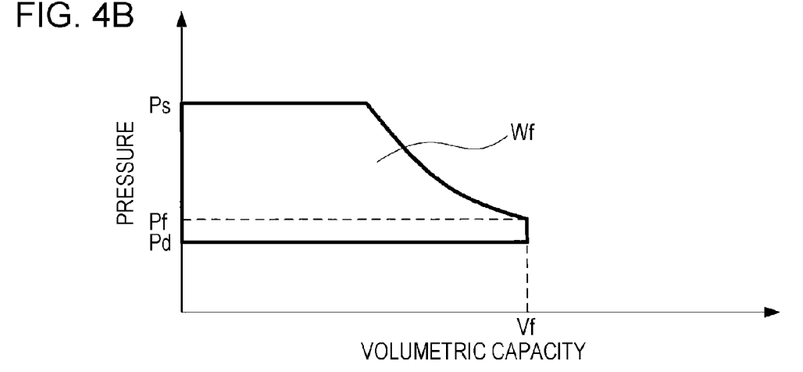
FIG. 4B is a P-V diagram showing the relationship between the pressure and the volumetric capacity of the operation room during underexpansion.
Figure 4C:
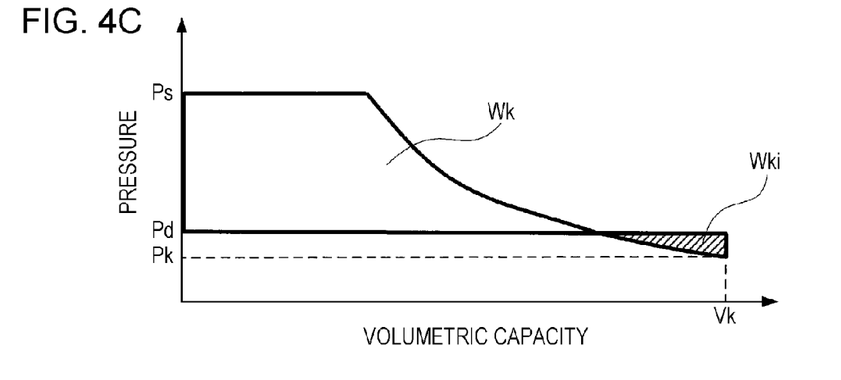
FIG. 4C is a P-V diagram showing the relationship between the pressure and the volumetric capacity of the operation room during overexpansion.

Next, the optimum expansion, underexpansion, and overexpansion of the working fluid in the expansion machine will be described with reference to FIGS. 4A to 4C. FIG. 4A shows a pressure-volumetric capacity diagram when the working fluid undergoes optimum expansion in the expansion machine. FIG. 4B shows a pressure-volumetric capacity diagram when the working fluid undergoes underexpansion in the expansion machine. FIG. 4C shows a pressure-volumetric capacity diagram when the working fluid undergoes overexpansion in the expansion machine.

As shown in FIG. 4A, the working fluid is sucked into the operation room of the expansion machine at pressure Ps. Upon completion of suction, as the volumetric capacity of the operation room increases, the pressure of the working fluid reduces gradually. The reduction in the pressure is completed when the volumetric capacity of the operation room reaches the maximum volumetric capacity Vi. As discharge starts, the volumetric capacity of the operation room reduces. In the case of optimum expansion, the pressure Pd of the working fluid equals the discharge pressure Pd (low-pressure-side pressure of the cycle) at the point at which the volumetric capacity of the operation room reaches the maximum volumetric capacity Vi.

As shown in FIG. 4B, the working fluid is sucked into the operation room of the expansion machine at pressure Ps. Upon completion of suction, as the volumetric capacity of the operation room increases, the pressure of the working fluid reduces gradually. As discharge starts, the pressure of the working fluid reduces to the discharge pressure Pd suddenly. In the case of underexpansion, the pressure Pf of the working fluid at the point at which the volumetric capacity of the operation room reaches the maximum volumetric capacity Vf is higher than the discharge pressure Pd.

As shown in FIG. 4C, the working fluid is sucked into the operation room of the expansion machine at pressure Ps. Upon completion of suction, as the volumetric capacity of the operation room increases, the pressure of the working fluid reduces gradually. The reduction in the pressure is completed when the volumetric capacity of the operation room reaches the maximum volumetric capacity Vk. As discharge starts, the volumetric capacity of the operation room reduces. In the case of overexpansion, the pressure Pk of the working fluid at the point at which the volumetric capacity of the operation room reaches the maximum volumetric capacity Vk is lower than the discharge pressure Pd.

The expansion work obtained in the expansion machine is transferred to the electric generator. The amount of the expansion work is equivalent to the amount of electric power generated by the electric generator. As shown in FIGS. 4A to 4C, the amount of expansion work obtained in the expansion machine is equivalent to the area of region Wi in the case of optimum expansion, the area of region Wf in the case of underexpansion, and the area obtained by subtracting the area of region Wki of an overexpansion loss from the area of region Wk in the case of overexpansion. The areas of these regions meet the following expression: (area of region Wi)>(area of region Wf)>(area of region Wk−area of region Wki). That is, the power generation efficiency in overexpansion is the smallest. If the revolutions of the expansion machine are the same, the amount of generated electricity is the smallest in the case of overexpansion.

In the present embodiment, the expansion volumetric capacity ratio Re of the expansion machine 11 is equal to or less than the ratio (Vos/Vss) of the specific volumetric capacity Vos to the specific volumetric capacity Vss. Accordingly, the pressure (the pressure of the working fluid in the operation room 57) of the operation room 57 of the expansion machine 11 is not less than the discharge pressure (low-pressure-side pressure of the cycle), so overexpansion does not occur in the expansion machine 11. Therefore, the present embodiment prevents an overexpansion loss from occurring and improves the reliability of the expansion machine 11.

Next, when hot water obtained in a thermal circuit is mainly used for heating in a CHP system having the same structure as the system in the present embodiment, the amount of generated electricity obtained by an expansion machine having a specific expansion volumetric capacity ratio was simulated. The results are shown in FIG. 5.

Figure 5:
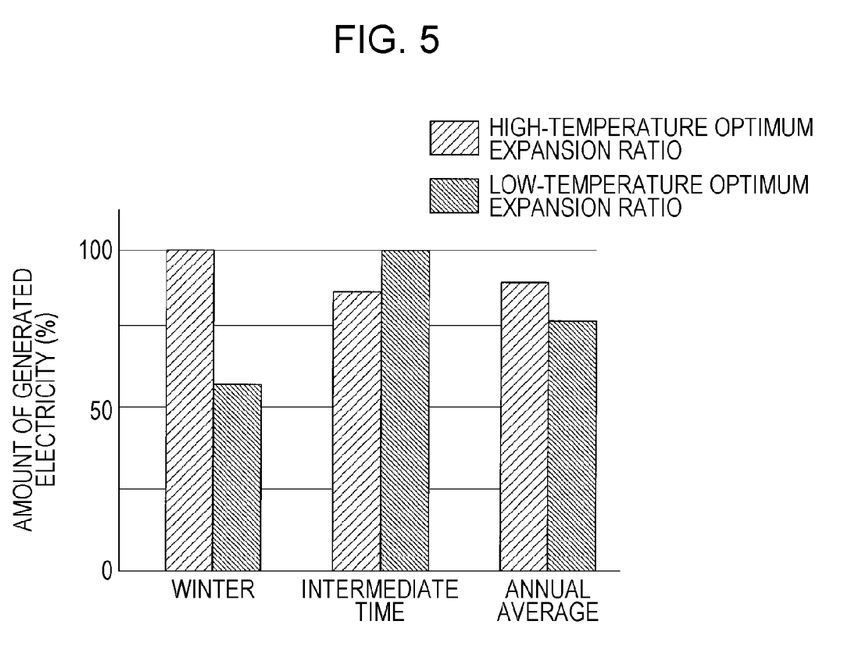
FIG. 5 is a graph showing the result of simulation.

In FIG. 5, the data of "HIGH-TEMPERATURE OPTIMUM EXPANSION RATIO" is assumed when the expansion volumetric capacity ratio of the expansion machine is set so that the working fluid undergoes optimum expansion in the expansion machine if the temperature of hot water at the outlet of the condenser is relatively high. That is, the data of "HIGH-TEMPERATURE OPTIMUM EXPANSION RATIO" is assumed when the expansion volumetric capacity ratio of the expansion machine is set so that optimum expansion occurs in winter. On the other hand, "LOW-TEMPERATURE OPTIMUM EXPANSION RATIO" is assumed when the expansion volumetric capacity ratio of the expansion machine is set so that the working fluid undergoes optimum expansion in the expansion machine if the temperature of hot water at the outlet of the condenser is relatively low. That is, the data of "LOW-TEMPERATURE OPTIMUM EXPANSION RATIO" is assumed when the expansion volumetric capacity ratio of the expansion machine is set so that optimum expansion occurs in intermediate time. When the expansion volumetric capacity ratio of the expansion machine is set so that optimum expansion occurs in intermediate time, overexpansion occurs in winter. The rates of the amounts of generated electricity of winter, intermediate time, and annual average were calculated with the amount of generated electricity for optimum expansion assumed to be 100%.

As shown in FIG. 5, when the expansion volumetric capacity ratio of the expansion machine is set to the low-temperature optimum expansion ratio, the amount of generated electricity was significantly reduced in a condition (winter in FIG. 5) in which the temperature of supplied hot water becomes high as compared with the case where the expansion volumetric capacity ratio of the expansion machine is set to the high-temperature optimum expansion ratio. When the expansion volumetric capacity ratio of the expansion machine is set to the high-temperature optimum expansion ratio, the amount of generated electricity was reduced in a condition (intermediate time in FIG. 5) in which the temperature of supplied hot water becomes low as in spring or autumn as compared with the case where the expansion volumetric capacity ratio of the expansion machine is set to the low-temperature optimum expansion ratio. However, the amount of reduction was smaller than that in low-temperature optimum expansion ratio in winter. When the average values are compared within a year, the amount of generated electricity for high-temperature optimum expansion ratio was significantly larger than the amount of generated electricity for low-temperature optimum expansion ratio.

As the simulation result in FIG. 5 shows, the CHP system 100 in the present embodiment can achieve high power generation efficiency for annual average since the expansion volumetric capacity ratio of the expansion machine 11 is appropriately adjusted. The technique in the present embodiment can construct the CHP system 100 so as to respond fluctuations in heat demands and required temperatures while preventing the complexity of the expansion machine, increases in cost, and reduction in reliability and maximize the amount of generated electricity. That is, the technique in the present embodiment can improve the efficiency of the CHP system 100.

The expansion volumetric capacity ratio of the expansion machine 11 can be adjusted so that underexpansion is constantly kept to surely prevent overexpansion. In this case, the efficiency is reduced since the working fluid undergoes underexpansion also in winter. However, the temperature of the working fluid at the discharge port of the expansion machine 11 in underexpansion is higher than in optimum expansion. Accordingly, the temperature of the working fluid at the inlet of the condenser 13 also becomes high. As a result, the heat medium of higher temperature can be obtained easily.

The technique disclosed in the present specification can be preferably adopted in a CHP system in which fluctuations in heat demands and required heat temperatures are large and small size is needed. Such CHP systems are suited to small facilities and ordinary households.

What is claimed is:

1. A combined heat and power system comprising:
   a Rankine cycle apparatus including:
      an evaporator that heats a working fluid by heat exchange between the working fluid and a heat source medium,
      an expander that converts expansion power of the working fluid into rotational power, and
      a condenser that cools the working fluid by heat exchange between the working fluid and a heat medium; and
   a thermal circuit that uses the heat medium heated by the condenser,
   wherein the expander is configured such that an expansion volume ratio of the expander is equal to or less than Ret,
   the combined heat and power system is configured such that a temperature of the heat medium at an outlet of the condenser becomes a predetermined temperature Tl,
   the combined heat and power system is configured such that a saturated vapor pressure of the working fluid at the predetermined temperature Tl becomes a predetermined saturated vapor pressure Pd,
   the combined heat and power system is configured such that a temperature of the heat source medium at an inlet of the evaporator becomes a predetermined temperature Th, and
   Ret is a predetermined expansion ratio in a theoretical Rankine cycle determined based on a discharge state and a suction state, in the discharge state a temperature and a pressure of the working fluid at a discharge port of the expander being determined by the predetermined temperature Tl and by the predetermined saturated vapor pressure Pd, and in the suction state a temperature and a pressure of the working fluid at a suction port of the expander being determined based on the predetermined temperature Th.

2. The combined heat and power system according to claim 1, wherein the temperature Tl of the heat medium is a temperature of the heat medium at the outlet of the condenser when the condenser heats the heat medium to an upper limit in a predetermined fluctuation range.

3. The combined heat and power system according to claim 1,
   wherein the heat medium is water.

4. The combined heat and power system according to claim 1,
   wherein the heat medium is air.

5. The combined heat and power system according to claim 1,
   wherein the expander is a displacement type expansion machine.

6. The combined heat and power system according to claim 1,
   wherein the thermal circuit includes at least one of a heating circuit and a hot-water supply circuit.

7. The combined heat and power system according to claim 1,
   wherein the temperature Tl of the heat medium is a highest temperature of the heat medium at the outlet of the condenser in winter.

8. The combined heat and power system according to claim 1,
   wherein the working fluid is an organic working fluid.

9. The combined heat and power system according to claim 1,
   wherein the working fluid is in a gaseous phase state at the discharge port of the expander during operation of the combined heat and power system.

* * * * *